May 31, 1966 — H. NAGIN — 3,253,378
WELDED METAL GRATING
Filed Oct. 1, 1963 — 2 Sheets-Sheet 1
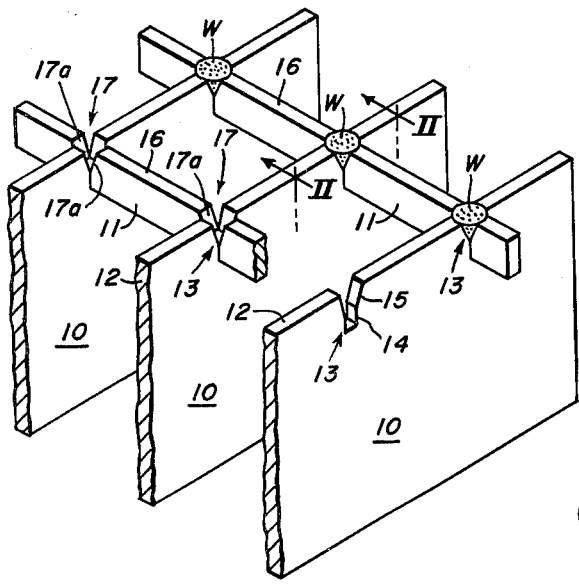
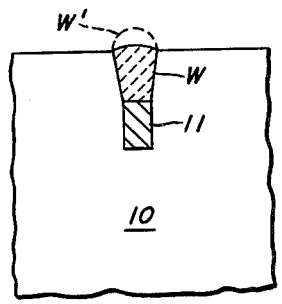
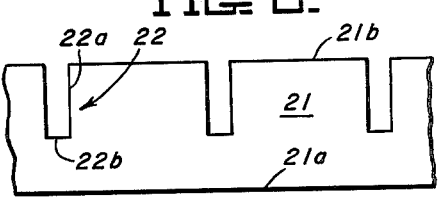
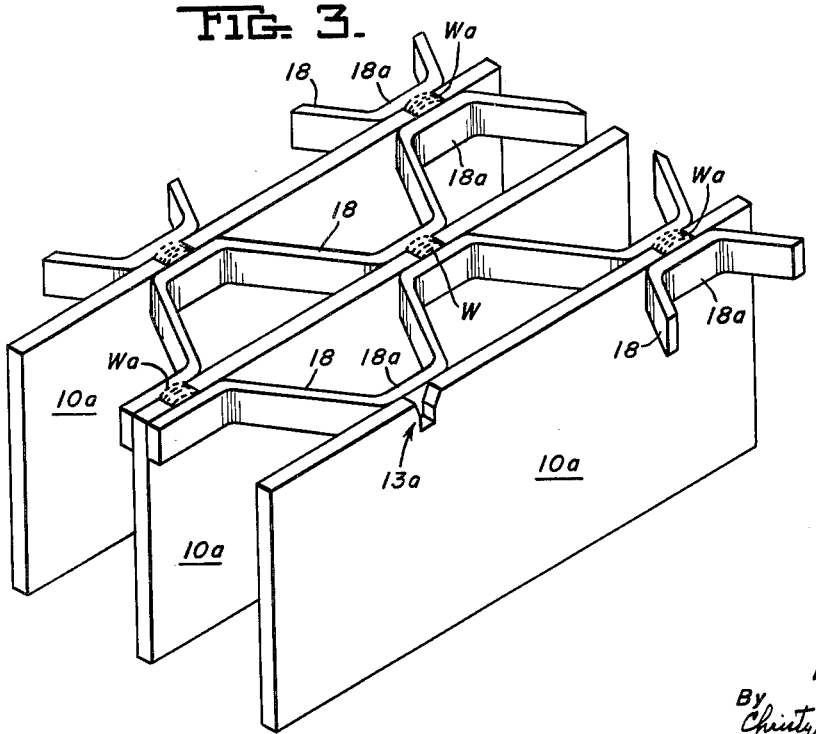
INVENTOR.
HAROLD NAGIN
By Christy, Parmelee & Strickland
Attorneys May 31, 1966  H. NAGIN  3,253,378
WELDED METAL GRATING
Filed Oct. 1, 1963  2 Sheets-Sheet 2
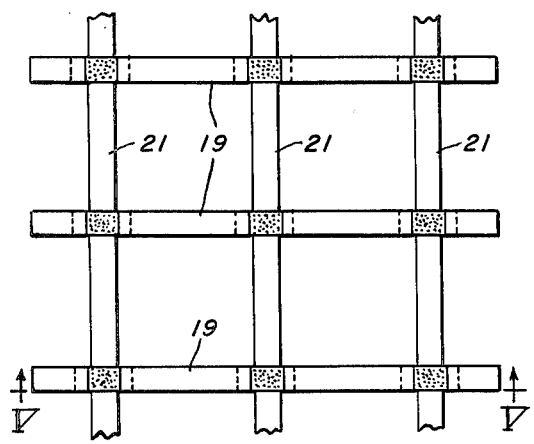
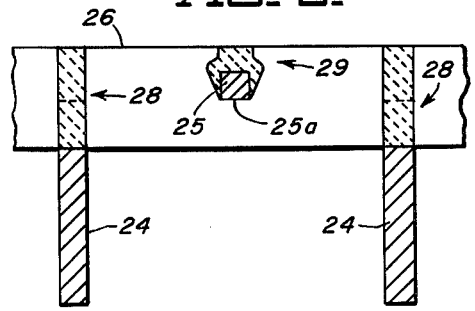
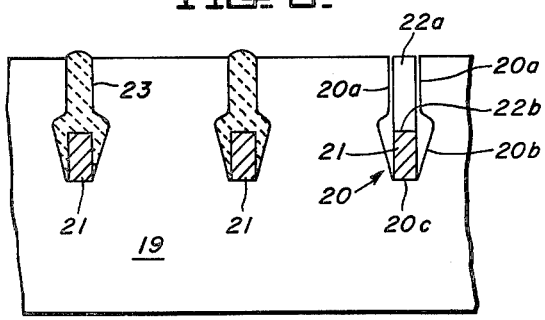
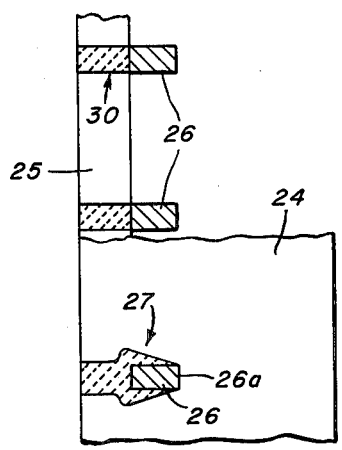
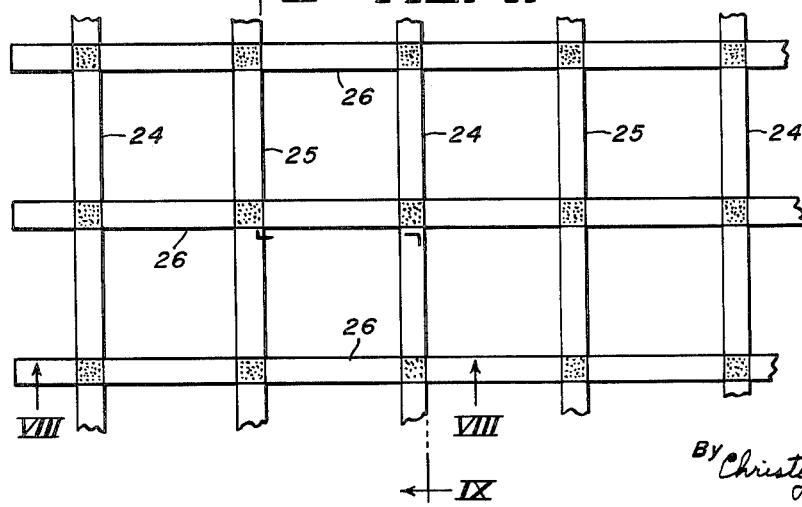
INVENTOR.
HAROLD NAGIN
BY Christy, Parmelee & Strickland
Attorneys

United States Patent Office 3,253,378
Patented May 31, 1966

3,253,378
WELDED METAL GRATING
Harold Nagin, Pittsburgh, Pa., assignor to Reliance Steel Products Company, McKeesport, Pa., a corporation of Pennsylvania
Filed Oct. 1, 1963, Ser. No. 313,065
3 Claims. (Cl. 52—668)

The present invention is directed to welded metal grating of the types employed in bridge floors, roadways, industrial structures and for other purposes. Although the invention provides greatest utility in grating subjected to heavy loads and repetitive shocks, it is also applicable to gratings subjected to lesser loadings.

The greater portion of such metal-grating now used is of the welded type. The principal difficulty encountered in previous welded metal grating was in maintaining the weld connections between the grating members. All such gratings have a common design, in that they are comprised of spaced main load bearing members connected together by cross bars. The load bearing members are customarily supported adjacent each end thereof and may, if desired, be provided with an intermediate support. The cross bars may abut or intersect the load bearing members and are welded thereto at the areas of engagement.

When said gratings are employed as a roadway or other forms of support for moving heavy vehicular loads the grating members are subjected to deflection under such loads and pounding by engagement with the vehicle wheels, which tends to damage the weld connection and eventually permit movement between the load bearing and cross members as the weld connection is destroyed.

One object of the present invention is to provide weld connections between the bearing and cross bars of a metal grating wherein the said bars at their areas of contact comprise an integral fused area.

Another object of the invention is to prepare the grating bearing bars, or cross bars, or both, at their areas of contact so as to provide for complete fusion of the said grating areas with the molten weld metal added during the formation of the weld connection.

Another object of the invention is to provide the forms of connection between the contacting areas of bearing and cross bars so that the weld connection may be effected by the known electro-pressure method and other known welding methods.

These and other objects of the invention will be made apparent from the following description and the drawings, forming a part thereof, wherein:

FIG. 1 shows an isometric view of a segment of grating illustrating both the weld connection and the preparation of the grating members for assembly and welding;

FIG. 2 shows a section taken through a weld connection on lines II—II of FIG. 1;

FIG. 3 shows an isometric view of a segment of grating embodying an alternate form of grating in accordance with the invention;

FIG. 4 shows a plan view of a segment of grating embodying another alternate form of grating in accordance with the invention;

FIG. 5 shows a section taken on lines V—V of FIG. 4;

FIG. 6 shows a side elevation of a portion of the grating cross bar illustrating the slotting thereof;

FIG. 7 shows a plan view of a further alternate form of grating embodying the invention;

FIG. 8 shows a section taken on line VIII—VIII of FIG. 7; and

FIG. 9 shows a section taken on line IX—IX of FIG. 7.

Referring now in detail to the drawing, particularly FIGS. 1 and 2, the segment of grating shown is comprised of bearing bars 10 and cross bars 11. These bars may be of rectangular or of other suitable dimensions for support of an anticipated load to be imposed thereon. Such grating is customarily made in sections of desired lengths and widths, and are customarily supported at the peripheral edges thereof. Any suitable means may be employed to retain each section of grating in place upon a supporting structure.

Each bearing bar 10 has, extending inwardly from the upper longitudinal face 12 thereof, a plurality of transversely spaced slotted openings, indicated generally as 13, to receive the cross bars 11. Each opening 13 is preferably of sufficient depth to receive the full height of the associated cross bar 11 and is preferably of a width to freely receive the cross bar. If desired the bearing bar slot 13 may be of a width necessitating a press fit of the cross bar, at least of the bottom portion of the cross bar. As shown in FIG. 1 the bottom portion 14 of the bearing bar slot 13 is approximately of the width of the cross bar and the upper portions 15 of the slot 13 diverge outwardly adjacent the upper longitudinal face 12 of the bearing bar. Each cross bar 11 at its area of contact with slot 13 of the bearing bar has a slot extending inwardly from the top longitudinal face 16 thereof and indicated generally as 17. The side faces 17a thereof diverge outwardly in a manner similar to that of the side faces 15 of the bearing bar slot 13. Thus, the outwardly diverging slot faces 15 and 17a provide an enlarged opening for reception of weld metal to secure the bars 10 and 11 together at the areas of intersection.

Preferably the weld connection between each bearing bar 10 and the cross bars 11 is of a modified machine type known in the art as Electro-Pressure Welding. For such an operation the slotted bearing bars 10 are maintained within a suitable jig (not shown), the slotted cross bars 11 are assembled with the slotted bearing bars and the welding machine applies pressure and suitable electric current to the assembled bars to first weld the bottom edges of the cross bars 11 to the bottom surface of the slot 13 in the bearing bars 10 and thereafter a welding rod is inserted into the exposed slotted openings of the intersecting bearing and cross bars. Application of the electric current to the welding rod causes the deposition of molten metal within said exposed slotted openings 13 and 17 filling same to the top plane of the bars, or above as shown by dotted lines in FIG. 2. This molten welding rod metal raises the temperature of the adjacent slot faces to fusion temperature and uniting them with the deposited welding rod metal. After discontinuance of the electric current and cooling of the metal, the intersecting bars in the area of the slots and at the base of the cross bars are integrally connected. Obviously, where the cross bars 11 have a full bearing upon the base of the slot the aforementioned pressure weld may be omitted and the entire weld effected within the exposed slotted openings of the intersecting bearing and cross bars.

An alternate form of the invention is shown in FIG. 3 of the drawing. As there shown, the main bearing bars 10a are provided with slots 13a, similar to that of FIG. 1, and the non-slotted reticulated cross bars 18 are disposed between the bearing bars 10a with the portions 18a thereof in abutting engagement with the bearing bars at the slotted openings 13a. When molten metal is deposited within the slotted openings 13a of the bearing bars 10a and engages the adjacent abutting face of the cross-bar portions 18a, the molten metal from the welding rod fuses with the adjacent surfaces of cross bar portions 18a providing an integral fused connection Wa for the full depth of slot 13a. If desired, the welds Wa may be built up above the adjacent planes of the bearing and cross-bar top surfaces as disclosed in FIG. 2.

A further alternate form of the invention is shown at FIGS. 4 to 6 of the drawing wherein bearing bars 19 are provided with longitudinally spaced transversely aligned slots indicated generally at 20 extending inwardly from the top edge 19a for a depth equal to the depth of the cross bars. The slots 20 have parallel spaced side walls 20a terminating in a widened portion defined by downwardly converging side walls 20b which terminate in a transverse connecting portion 20c upon which the cross bar 21 seats. Cross bars 21 are provided with longitudinally spaced transversely aligned slots indicated generally at 22. Each slot 22 is defined by spaced parallel side walls 22a extending inwardly from top edge 21b of the cross bar and terminating in a transverse connecting portion 22b disposed in spaced relation to bottom edge 21a of the cross bar.

As previously described the bearing and cross bars 19, 21 are assembled in a suitable jig for welding. As best shown in FIG. 5 the walls of slots 20, 22 provide a substantial opening into which a welding rod may be inserted for initial contact with the unslotted portion of cross bar 21 and the opening may be filled with molten welding rod metal. Due to widely spaced slot wall portions 20b the molten weld metal is free to flow downwardly over the unslotted portions of cross bars 21 fusing same and the sides of the bearing bar slots 20 with the deposited weld metal into an integral unit. As previously discussed, the weld metal may be built up above the top faces of the adjacent bearing and cross bars.

Referring now to FIGS. 7 to 9 of the drawing wherein a segment of a still further modification of the invention is shown, the grating is comprised of main bearing bars 24, auxiliary bearing bars 25 and cross bars 26. The main bearing bars 24 are rectangular and of greater depth than the rectangular cross bars 26, which in turn are of greater depth than the auxiliary bearing bars 25. The slots indicated generally as 27, in the main bearing bars 24 are of the same general shape as those indicated on FIG. 5 as 20 in the main bearing bars 19 thereof. Slots 27 are of suitable dimensions to receive the cross bars 26 of FIGS. 7 and 8. The slots in the cross bars 26 are of two different contours and sizes. Slots, indicated generally as 28, in cross bars 26 for welding to main bearing bars 24 are of the same general contour as slots 22 of cross bars 21 of FIG. 6 of the drawing. The slots 29 in cross bars 26, intermediate the slots 28, for reception of the auxiliary bearing bars 25 are of the same general contour as slots 27 in main bearing bars 24. Slots 29 are modified in dimensions to conform to the dimensions of the auxiliary bearing bars 25. Slots 30 in auxiliary bearing bars 25 are of the same contour as slots 28 in the cross bar 26 but may be of different dimensions.

When effecting the weld connections between the bearing bars and cross bars of the grating, exemplified in FIGS. 7 to 9 of the drawings, the bottom surfaces 26a of cross bars 26 may be electro-pressure welded to bearing bars 24 and the bottom surfaces 25a of the auxiliary bearing bars 25 may also be electro-pressure welded to the cross bars 26, if desired, before effecting the deposition of welding rod metal into the exposed slots 27, 28 and 29, 30.

Each of the several forms of welding grating disclosed herein embodies the common concept of providing a slotted opening of substantial area for reception of a mass of molten welding rod metal which is at a temperature above the melting point of the metal bars of the grating. Thus, the depositing welding rod metal heats the exposed sides of the slotted opening in the bars to fusion temperature whereby the depositing welding rod metal and contacted grating member slotted faces fuse into an integral mass. Since the cross bars are provided with a bearing upon the base of the slots of the bearing bars there is no possibility of relative movement between the intersecting grating members to destroy the welded connections therebetween. Additionally, the integral connection between the deposited weld metal and the adjacent faces of the previously slotted grating members provides vertical support for the cross members when placed under shock loading, thereby preventing the cross members from cutting into the underlying bearing member portion and thereby tending to crack the welds. These conditions are obtained regardless of whether the bearing surfaces of the cross bars upon the base of the bearing bar slots are previously pressure welded, as hereinbefore discussed, or not so welded.

I claim:
1. In a metal grating, in combination,
  (a) a plurality of longitudinally extending transversely spaced bearing bars,
  (b) a plurality of transversely aligned longitudinally spaced slots extending inwardly from the top face of each bearing bar,
  (c) each said bearing bar slots having a depth substantially equal to that of a cross bar to be received therein and comprised of spaced sidewall upper portions freely receiving the cross bar and terminating in initially outwardly diverging then inwardly converging side wall portions extending to adjacent the base of the cross bar to be received therein,
  (d) cross bars disposed transversely of said bearing bars and received in said bearing bar slots,
  (e) each said cross bars at their areas of engagement with said bearing bar slots having slots therein extending inwardly from the top of the cross bar for a portion of the depth thereof, and
  (f) a weld connection between each bearing and intersecting cross bars resulting from depositing molten welding rod metal in the exposed bar openings and the fusion thereof with the adjacent slotted bar surfaces.

2. The grating as defined in claim 1, wherein
  (a) each cross bar has slotted openings therein intermediate the adjacent pairs of bearing bars and extending inwardly from the top surface of the cross bar for a portion of the depth thereof,
  (b) auxiliary bearing bars of less depth than said cross bars disposed in said cross bar slots and provided with slotted openings extending inwardly from the top surface of the auxiliary bearing bar for a portion of the depth thereof, and
  (c) a weld connection filling the aligned slots of said intersecting cross bars and auxiliary bearing bars.

3. In a metal grating in combination,
  (a) a plurality of longitudinally extending transversely spaced bearer bars,
  (b) a plurality of transversely aligned longitudinally spaced slots extending inwardly from the top face of each bearer bar for a portion of the depth thereof for reception of cross bars,
  (c) cross bars disposed transversely of said bearer bars and engaged within said bearer bar slots.
  (d) each said cross bars at the intersection with each said bearer bars having a slotted opening therein for a portion of the depth thereof and in transverse alignment with the adjacent bearer bar slotted portion, (e) each said bearer bar slots having a transversely enlarged bottom portion extending upwardly from the base thereof and above the unslotted portion of the cross bar received therein, and
(f) molten welding rod metal deposited within each said adjacent bearer bar and cross bar slots for substantially the full depths thereof and enclosing the sidewalls of said cross bar unslotted portions therein.

References Cited by the Examiner

UNITED STATES PATENTS

| 2,645,985 | 7/1953 | Beebe. |
| 2,740,335 | 4/1956 | Greulich. |
| 3,057,272 | 10/1962 | Greulich. |

JACOB L. NACKENOFF, *Primary Examiner.*